US011387902B2

(12) United States Patent
Kimsey-Lin

(10) Patent No.: US 11,387,902 B2
(45) Date of Patent: *Jul. 12, 2022

(54) WIRELESS CONTROL OF A PASSENGER SERVICE UNIT USING A PERSONAL DEVICE OF A PASSENGER

(71) Applicant: The Boeing Company, Chicago, IL (US)

(72) Inventor: Melanie L. Kimsey-Lin, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/845,770

(22) Filed: Apr. 10, 2020

(65) Prior Publication Data

US 2021/0320717 A1 Oct. 14, 2021

(51) Int. Cl.
*H04B 10/00* (2013.01)
*H04B 10/116* (2013.01)
*H04B 10/114* (2013.01)
*B64D 11/00* (2006.01)

(52) U.S. Cl.
CPC ........ *H04B 10/116* (2013.01); *B64D 11/0015* (2013.01); *H04B 10/1143* (2013.01); *H04B 10/1149* (2013.01); *B64D 2011/0053* (2013.01)

(58) Field of Classification Search
CPC .............. H04B 10/116; H04B 10/1143; H04B 10/1149; G08C 23/04; B64D 11/0015; B64D 2011/0053
See application file for complete search history.

(56) References Cited

U.S. PATENT DOCUMENTS

| 6,614,126 B1* | 9/2003 | Mitchell ............ H04B 10/1149 307/9.1 |
| 9,654,222 B1 | 5/2017 | Shatz |
| 10,693,557 B1* | 6/2020 | Ayotte .................... H04W 4/48 |
| 2012/0191297 A1* | 7/2012 | Callahan .......... B64D 11/00155 701/36 |
| 2014/0233959 A1* | 8/2014 | Ibrahim ................. G08C 23/04 398/106 |
| 2014/0308048 A1* | 10/2014 | Roberts ..................... H04L 1/08 398/187 |
| 2014/0375982 A1 | 12/2014 | Jovicic |
| 2015/0372753 A1 | 12/2015 | Jovicic |

(Continued)

OTHER PUBLICATIONS

Wikipedia, In-flight entertainment, retrieved from: https://en.wikipedia.org/w/index.php?title=In-flight_entertainment&oldid=949273933, 12 pages.

*Primary Examiner* — David C Payne
*Assistant Examiner* — Pranesh K Barua
(74) *Attorney, Agent, or Firm* — Sage Patent Group

(57) ABSTRACT

A method for controlling a passenger service unit includes receiving, by a personal device of a passenger, an electromagnetic (EM) signal. The EM signal includes identification information of the passenger service unit. The method also includes transmitting, by the personal device, a message for controlling operation of one or more selected devices of the passenger service unit. The message includes an identification of the one or more selected devices of the passenger service unit and a control input for each of the one or more selected devices.

20 Claims, 5 Drawing Sheets

(56) References Cited

U.S. PATENT DOCUMENTS

| | | | |
|---|---|---|---|
| 2015/0372754 A1* | 12/2015 | Choi | H05B 47/175 |
| | | | 398/130 |
| 2015/0373121 A1* | 12/2015 | Secilmis | B64D 11/0015 |
| | | | 455/41.2 |
| 2017/0219684 A1 | 8/2017 | Jovicic | |
| 2017/0244482 A1 | 8/2017 | Dimare | |
| 2017/0374422 A1* | 12/2017 | Wang | H04N 21/4627 |
| 2018/0075717 A1* | 3/2018 | Reinbold | H04L 67/12 |
| 2019/0035082 A1 | 1/2019 | Kadambala | |
| 2019/0109843 A1 | 4/2019 | Kimsey-Lin et al. | |
| 2019/0280769 A1* | 9/2019 | Verbrugh | H05B 47/125 |
| 2019/0305846 A1* | 10/2019 | Kido | H04B 10/808 |
| 2020/0186244 A1 | 6/2020 | Li | |
| 2020/0339266 A1* | 10/2020 | McMillan | B64D 11/0639 |

* cited by examiner

WIRELESS CONTROL OF A PASSENGER SERVICE UNIT USING A PERSONAL DEVICE OF A PASSENGER

CROSS-REFERENCE TO RELATED APPLICATIONS

This application is related to U.S. patent application Ser. No. 16/845,751, now U.S. Pat. No. 11,176,810, issued on Nov. 16, 2021, entitled "Wireless Control of a Passenger Service Unit," filed the same date as the present application and incorporated herein by reference.

FIELD

The subject disclosure relates to a passenger service unit onboard an aircraft and more particularly to wireless control of a passenger service unit.

BACKGROUND

Most current wide-body passenger aircraft, such as for example, passenger twin aisle aircraft use in-flight entertainment (IFE) to control reading lights and attendant call devices. However, as passengers bring more smart devices on to the aircraft, some airlines are streaming IFE content directly to passenger personal devices and eliminating the in-seat IFE controls. The reading light and attendant call functions remain in the passenger service unit (PSU) above each seat. The passenger service units on such aircraft, particularly twin-aisle aircraft, may be out of reach of most seated passengers, especially in a center seating area. Additionally, some known passenger aircraft have the option to delete the center bins, and instead install a fairing with the center PSU mounted above the reaching height of a fifth percentile female, meaning a portion of the population may not be able to reach the PSU even when standing.

SUMMARY

In accordance with an example, a method for controlling a passenger service unit includes receiving, by a personal device of a passenger, an electromagnetic (EM) signal, wherein the EM signal includes identification information of the passenger service unit. The method also includes transmitting, by the personal device, a message for controlling operation of one or more selected devices of the passenger service unit. The message includes an identification of the one or more selected devices of the passenger service unit and a control input for each of the one or more selected devices.

In accordance with another example, a personal device configured to control a passenger service unit includes a processor and a memory associated with the processor. The memory includes computer-readable program instructions that, when executed by the processor causes the processor to perform a set of functions. The set of functions include receiving an electromagnetic (EM) signal, wherein the EM signal includes identification information of the passenger service unit. The set of functions also include transmitting a message for controlling operation of one or more selected devices of the passenger service unit. The message includes an identification of the one or more selected devices of the passenger service unit and a control input for each of the one or more selected devices.

In accordance with an example and any of the preceding examples, wherein receiving the EM signal includes receiving a visible light communication (VLC) signal that is receivable by an optical sensor of the personal device.

In accordance with an example and any of the preceding examples, wherein receiving the EM signal includes using pulse-width modulation (PWM) in the EM signal to define the identification information of the passenger service unit.

In accordance with an example and any of the preceding examples, wherein using the PWM includes cycling a light of the passenger service unit on and off at a PWM rate that is faster than a human eye can detect.

In accordance with an example and any of the preceding examples, wherein the method or system further include receiving multiple EM signals transmitted by the passenger service unit; and using the multiple EM signals to triangulate a location of the personal device to pair the personal device with a particular passenger service unit. The personal device of the passenger includes a passenger service unit (PSU) control application configured to pair the personal device with the particular passenger service unit using the multiple EM signals and based on the identification information of the passenger service unit.

In accordance with an example and any of the preceding examples, wherein transmitting the message includes transmitting a wireless message to a cabin network control system for controlling the one or more selected devices of the passenger service unit. The wireless message includes the identification information of the passenger service unit, the identification of the one or more selected devices of the passenger service unit to be controlled, and the control input for each of the one or more selected devices of the passenger service unit. The cabin network control system is configured to transmit a control message to the passenger service unit in response to receiving the wireless message. The control message includes the identification information of the passenger service unit, the identification of the one or more selected devices of the passenger service unit to be controlled, and the control input for each of the one or more selected devices.

In accordance with an example and any of the preceding examples, wherein transmitting the message comprises transmitting a wireless control message from the personal device of the passenger to the passenger service unit to control operation of the one or more selected devices of the passenger service unit in response to the wireless control message.

In accordance with an example, a personal device configured to control a passenger service unit includes a passenger service unit (PSU) control application operating on a personal device of a passenger. The personal device also includes an electromagnetic (EM) receiver, wherein the PSU control application is configured to control the EM receiver of the personal device to receive an electromagnetic (EM) signal from the passenger service unit. The EM signal includes identification information of the passenger service unit. The personal device additionally includes a transmitter, wherein the PSU control application is configured to control the transmitter of the personal device to transmit a message for controlling operation of one or more selected devices of the passenger service unit. The message includes an identification of the one or more selected devices of the passenger service unit and a control input for each of the one or more selected devices.

In accordance with an example and any of the preceding examples, wherein the EM receiver includes an optical sensor configured to receive a visible light communication (VLC) signal as the EM signal.

In accordance with an example and any of the preceding examples, wherein the EM receiver is configured to receive the EM signal using pulse-width modulation in the EM signal to define the identification information of the passenger service unit.

In accordance with an example and any of the preceding examples, wherein the PSU control application is further configured to control the EM receiver of the personal device to receive multiple EM signals from the passenger service unit, and wherein the PSU control application uses the multiple EM signals to triangulate a location of the personal device to pair the personal device to a particular passenger service unit.

In accordance with an example and any of the preceding examples, wherein the personal device further includes a display, wherein the PSU control application is further configured to control the display of the personal device to present a graphical user interface on the display to allow a particular device or devices of the passenger service unit to be selected by the passenger for controlling operation of the particular device or devices.

In accordance with an example and any of the preceding examples, wherein the particular device or devices of the passenger service unit represented in the graphical user interface for selection by the passenger include at least one of a light, an airflow control device, and an attendant call device.

In accordance with an example and any of the preceding examples, wherein the transmitter is a transceiver of the personal device and wherein the PSU control application is further configured to control the transceiver of the personal device to transmit a wireless message to a cabin network control system for controlling operation of the one or more selected devices of the passenger service unit. The wireless message includes the identification information of the passenger service unit, the identification of the one or more selected devices of the passenger service unit, and the control input for each of the one more selected devices of the passenger service unit.

In accordance with an example and any of the preceding examples, wherein the cabin network control system is configured to transmit a control message to the passenger service unit in response to receiving the wireless message from the personal device. The control message includes the identification information of the passenger service unit, the identification of the one or more selected devices of the passenger service unit and the control input for each of the one or more selected devices.

In accordance with an example and any of the preceding examples, wherein the transmitter is a wireless transmitter of the personal device and wherein the PSU control application is further configured to control the wireless transmitter of the personal device to transmit a wireless control message to the passenger service unit to control operation of the one or more selected devices. The wireless control message includes the identification of the one or more selected devices of the passenger service unit and the control input for each of the one or more selected devices.

In accordance with an example and any of the preceding examples, wherein the wireless transmitter is configured to transmit the wireless control message as a visible light communication (VLC) control message. The VLC control message being receivable by an optical sensor of the passenger service unit.

The features, functions, and advantages that have been discussed can be achieved independently in various examples or may be combined in yet other examples further details of which can be seen with reference to the following description and drawings.

DETAILED DESCRIPTION

The embodiments described herein can enable a passenger on an aircraft to control a passenger service unit (PSU) remotely while seated. The systems and method described herein allow the passenger to interact with the passenger service unit without directly contacting the passenger service unit. Accordingly, the passenger can operate a passenger service unit that is out of reach while seated or standing. As will be described in more detail herein, the system uses electromagnetic signals, such as Visible Light Communication (VLC) signals, to transmit identification information of a passenger service unit to a personal device of a passenger. The electromagnetic signals or VLC signals may use pulse-width modulation to define the identification information of the passenger service unit. The identification information can be received by an optical sensor, such as a camera of the personal device, e.g., passenger's smartphone, tablet computer, etc. The passenger's personal device includes application software provided by an airline or aircraft manufacture. The application software of the personal device uses the identification information to pair the personal device with a particular passenger service and to control the devices of the passenger service unit, such as a reading light, airflow control device, attendant call device, or other devices.

Figure 1:
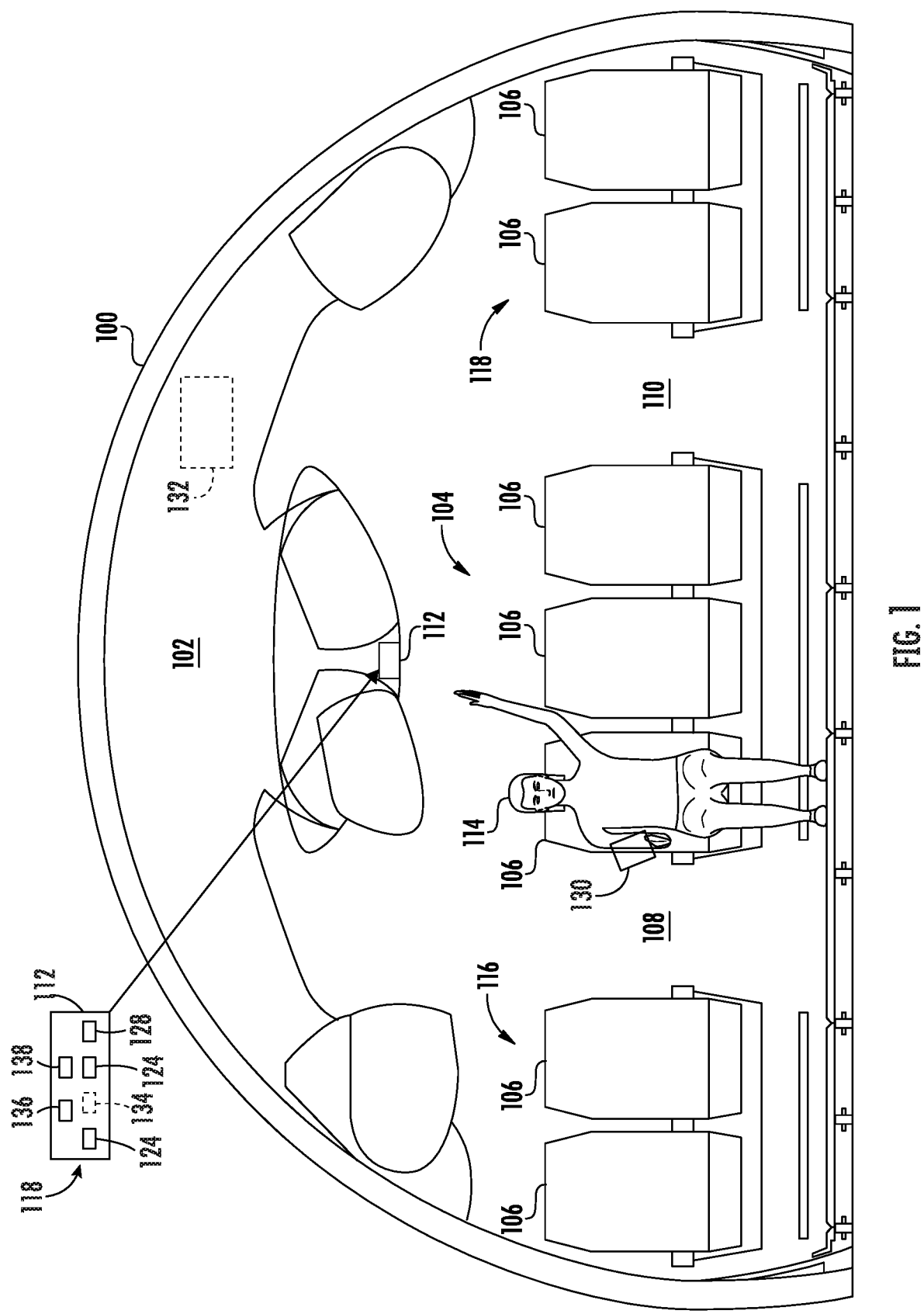
FIG. 1 is a cross-sectional view an example of a fuselage of a passenger aircraft in accordance with an example of the subject disclosure.

FIG. 1 is a cross-sectional view an example of a fuselage 100 of a passenger aircraft 102 in accordance with an example of the subject disclosure. The exemplary passenger aircraft 102 is a wide-body aircraft that includes a center section 104 of seats 106 defined between aisles 108 and 110. As illustrated in the example in FIG. 1, a passenger service unit 112 is beyond the average arm reach of a passenger 114 seated in one of the seats 106 of the center section 104. The subject disclosure describes examples of a system 116 and method 500 for controlling devices 118 of the passenger service unit 112 without the passenger 114 having to unbuckle her seat belt and stand. The exemplary system 116 and method 500 are also usable for controlling the devices 118 of the passenger service unit 112 in situations where the passenger 114 can reach the passenger service unit 112 without standing, for example in the outside sections 120 and 122 of seats 106, or in other situations where there may be difficulty in reaching any overhead devices, such as devices 118. Examples of the devices 118 of the passenger service unit 112 include, but are not necessarily limited to, a light 124, an airflow control device 126, and an attendant call device 128. The light 124 is useable for reading or other purposes by the passenger 114.

The system 116 for controlling the passenger service unit 112 includes a processor 136 and a memory 138 associated with the processor 136. In the example in FIG. 1, the processor 136 and the memory 138 reside in the passenger service unit 112. As described in more detail herein, the memory 138 includes computer-readable program instructions that, when executed by the processor 136 causes the processor 136 to perform a set of functions or a method. An example of a method 500 performed at least partially by the system 116 will be described in more detail with reference to FIG. 5.

Figure 2:
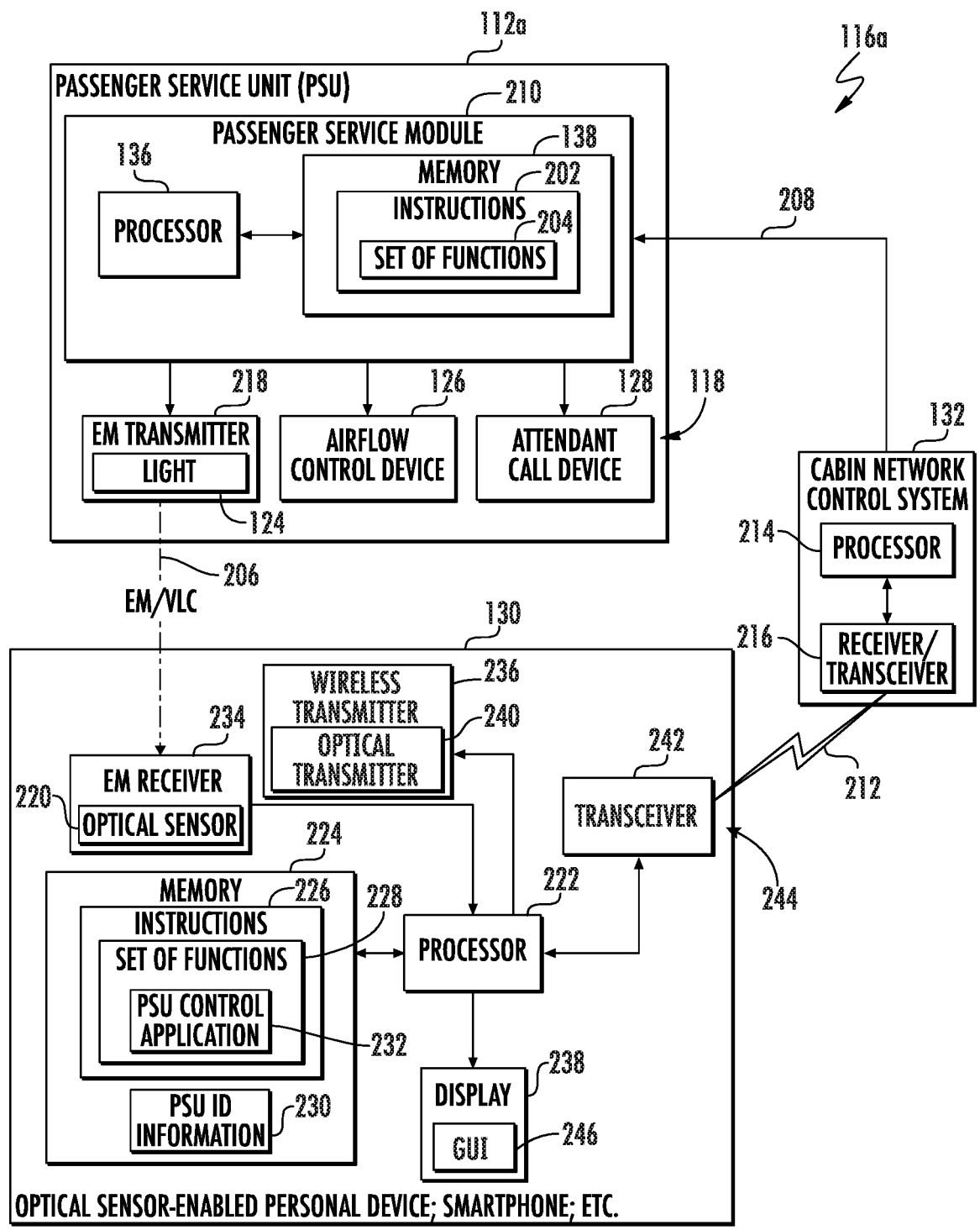
FIG. 2 is a block schematic diagram of an example a system for controlling a passenger service unit of the fuselage of FIG. 1, in accordance with an example of the subject disclosure.

In some examples, such as the exemplary system 116a in FIG. 2, a personal device 130 of the passenger 114 is configured to wirelessly communicate with a cabin network control system 132 for controlling the devices 118 of the passenger service unit 112. In other examples, such as the exemplary system 116b in FIG. 3, the personal device 130 is configured to wirelessly communicate with the passenger service unit 112b for controlling the devices 118 of the passenger service unit 112b. In the exemplary system 116b in FIG. 3, the passenger service unit 112b includes a wireless receiver 134 for receiving a wireless control message 302 or 308 from the personal device 130 of the passenger 114 for controlling one or more of the devices 118. Examples of the personal device 130 include but are not necessarily limited to a smartphone, tablet computer, laptop computer with a camera or any optical sensor-enabled personal device.

FIG. 2 is a block schematic diagram of an example of a system 116a for controlling a passenger service unit 112a of the fuselage of FIG. 1, in accordance with an example of the subject disclosure. In some examples, the system 116a is used for the system 116 in FIG. 1 and the passenger service unit 112a is used for the passenger service unit 112 in FIG. 1. The passenger service unit 112a is an example of a passenger service unit 112 that is used in an aircraft that includes a cabin network control system 132 and the passenger service unit 112a is not equipped with a wireless receiver for receiving wireless or EM signals. Accordingly, one of the uses or benefits of the exemplary system 116a is that the system 116a is implementable in an aircraft having a cabin network control system 132 and the passenger service unit 112a is not equipped with a wireless receiver. The system 116a includes a processor 136 and a memory 138 associated with the processor 136. In the example in FIG. 2, the processor 136 and the memory 138 reside in the passenger service unit 112a. The memory 138 includes computer-readable program instructions 202 that, when executed by the processor 136 causes the processor 136 to perform a method or set of functions 204. An example of the method or the set of functions 204 will be described in more detail with reference to FIG. 5 as operations or steps of the method 500 performed by the passenger service unit 112a. In some examples, the set of functions 204 include transmitting, by a passenger service unit 112a, an electromagnetic (EM) signal 206 that is receivable by a personal device 130 of a passenger 114. The EM signal 206 includes identification information 230 of the passenger service unit 112a. The set of functions 204 also include receiving a control message 208, by the passenger service unit 112a. The control message 208 includes an identification of one or more selected devices 118 of the passenger service unit 112a and a control input for each of the one or more selected devices 118. The set of functions 204 additionally include controlling operation of the one or more selected devices 118 of the passenger service unit 112a in response to receiving the control message 208 and based on the control input for each selected device 118.

In the example in FIG. 2, the passenger service unit 112a includes a passenger service module 210. The passenger service module 210 includes the processor 136 and the memory 138. The passenger service module 210 is configured to receive the control message 208 from a cabin network control system 132 in response to the cabin network control system 132 receiving a wireless message 212 from the personal device 130 of the passenger 114. The wireless message 212 includes the identification of the passenger service unit 112a, the identification of the one or more selected devices 118 of the passenger service unit 112a, and the control input for each of the one or more selected devices 118.

The cabin network control system 132 includes a processor 214 for performing operations by the cabin network control system 132. The cabin network control system 132 or processor 214 is configured to transmit the control message 208 to the passenger service unit 112a or passenger service module 210 in response to receiving the wireless message 212 from the personal device 130. The cabin network control system 132 also includes a receiver 216 for receiving the wireless message 212 from the personal device 130. In some examples, the receiver 216 is a transceiver that can transmit and receive wireless signals.

The passenger service unit 112a also includes an electromagnetic (EM) transmitter 218 configured to transmit the EM signal 206 that is receivable by the personal device 130 of the passenger 114. As previously described, the EM signal 206 includes identification information 230 of the passenger service unit 112a. In some examples, the EM transmitter 218 is configured to transmit a visible light communication (VLC) signal as the EM signal 206. The VLC signal is receivable by an optical sensor 220 of the personal device 130. In some examples, the EM transmitter 218 is configured to transmit the EM signal 206 using pulse-width modulation in the EM signal 206 to define the identification information 230 of the passenger service unit 112a to the personal device 130 of the passenger 114.

As previously described, the passenger service unit 112a includes a plurality of devices 118. The passenger service unit 112a is configured to receive a control message 208. The control message 208 includes an identification of one or more selected devices 118 of the plurality of devices 118 of the passenger service unit 112a and a control input for each of the one or more selected devices 118. The one or more selected devices 118 are controlled in response to the control message 208 being received and based on the control input for each selected device 118.

In the example in FIG. 2, the system 116a also includes the personal device 130. The personal device 130 is configured to control a passenger service unit 112a. The personal device 130 includes a processor 222 and a memory 224 associated with the processor 222. The memory 224 includes computer-readable program instructions 226 that, when executed by the processor 222 causes the processor 222 to perform a method or set of functions 228. An example of the method or the set of functions 228 are described with reference to FIG. 5 as steps of the method 500 being performed by the personal device 130. In some examples, the set of functions 228 include receiving, by a personal device 130 of a passenger 114, an electromagnetic (EM) signal 206. The EM signal 206 includes identification information 230 of the passenger service unit 112a. In the example in FIG. 2, the PSU identification information 230 is stored in the memory 224 of the personal device 130. The set of functions 228 also include transmitting, by the personal device 130 of the passenger 114, a wireless message 212 or wireless control message 302 or 308 (FIG. 3) for controlling operation of one or more selected devices 118 of the passenger service unit 112a. The wireless message 212 or a wireless control message 302 or 308 includes an identification of the one or more selected devices 118 of the passenger service unit 112a and a control input for each of the one or more selected devices 118.

The personal device 130 configured to control a passenger service unit 112 also includes a passenger service unit (PSU) control application 232 operating on the personal device 130 of a passenger 114. In some examples, the PSU control application 232 is embodied in the set of functions 228 and performs the operations or method steps described with reference to FIG. 5 as steps of the method 500 being performed by the personal device 130. The personal device 130 additionally includes an electromagnetic (EM) receiver 234, a transmitter 244 and a display 238. The transmitter 244 is either the wireless transmitter 236 or the transceiver 242 of the personal device 130 as described in more detail herein. The PSU control application 232 is configured to control the EM receiver 234 of the personal device 130 to receive an EM signal 206 from the passenger service unit 112a. As previously described, the EM signal 206 includes identification information 230 of the passenger service unit 112a. The PSU control application 232 is also configured to control the transmitter 244 of the personal device 130 to transmit a message 212 for controlling operation of one or more selected devices 118 of the passenger service unit 112a. As previously described, the message 212 includes an identification of the one or more selected devices 118 of the passenger service unit 112a and a control input for each of the one or more selected devices 118.

In some examples, the EM receiver 234 includes an optical sensor 220 or a camera of the personal device 130 configured to receive a visible light communication (VLC) signal as the EM signal 206. In some examples, the EM receiver 234 is configured to receive the EM signal 206 using pulse-width modulation in the EM signal 206 to define the identification information 230 of the passenger service unit 112a.

In some examples, the PSU control application 232 is further configured to control the EM receiver 234 of the personal device 130 to receive multiple EM signals 206 from the passenger service unit 112a. The PSU control application 232 uses the multiple EM signals 206 to triangulate a location of the personal device 130 to pair the personal device 130 to a particular passenger service unit 112a as described in more detail with reference to FIG. 5.

In the example in FIG. 2, the transmitter 244 is the transceiver 242 of the personal device 130. The PSU control application 232 is further configured to control the transceiver 242 of the personal device 130 to transmit a wireless message 212 to the cabin network control system 132 for controlling operation of the one or more selected devices 118 of the passenger service unit 112a. The wireless message 212 includes the identification information 230 of the passenger service unit 112a, the identification of the one or more selected devices 118 of the passenger service unit 112a to be controlled, and the control input for each of the one or more selected devices 118 of the passenger service unit 112a. As previously described, the cabin network control system 132 is configured to transmit a control message 208 to the passenger service unit 112a in response to the wireless message 212 from the personal device 130. The control message 208 includes the identification information 230 of the passenger service unit 112a, the identification of the one or more selected devices 118 of the passenger service unit 112a, and the control input for each of the one or more selected devices 118.

In an example as described in more detail with reference to FIG. 3, the transmitter 244 is a wireless transmitter 236 of the personal device 130. In this example, the PSU control application 232 is further configured to control the wireless transmitter 236 of the personal device 130 to transmit a wireless control message 302 to the passenger service unit 112b to control operation of the one or more selected devices 118. The wireless control message 302 includes the identification of the one or more selected devices 118 of the passenger service unit 112b and the control input for each of the one or more selected devices 118. In some examples, the wireless transmitter 236 is configured to transmit the wireless control message 302 as a visible light communication (VLC) control message being receivable by an optical sensor 306 of the passenger service unit 112b.

The PSU control application 232 is further configured to control the display 238 of the personal device 130 to present a graphical user interface (GUI) 246 on the display 238 to allow a particular device 118 or devices 118 of the passenger service unit 112a to be selected by the passenger 114 for controlling operation of the particular device 118 or devices 118. The particular device 118 or devices 118 of the passenger service unit 112a represented in the graphical user interface 246 for selection by the passenger 114 include at least one of a light 124, an airflow control device 126, and an attendant call device 128. An example of a graphical user interface 246 will be described in more detail with reference to FIG. 4. In some examples, the display 238 is a touch-screen type display that allows the user to enter information by touching the screen with a finger, stylus or other apparatus. In other examples, the personal device 130 includes or also includes a keypad or keyboard (not shown) as known in the art for selecting or entering information in a computer device.

Figure 3:
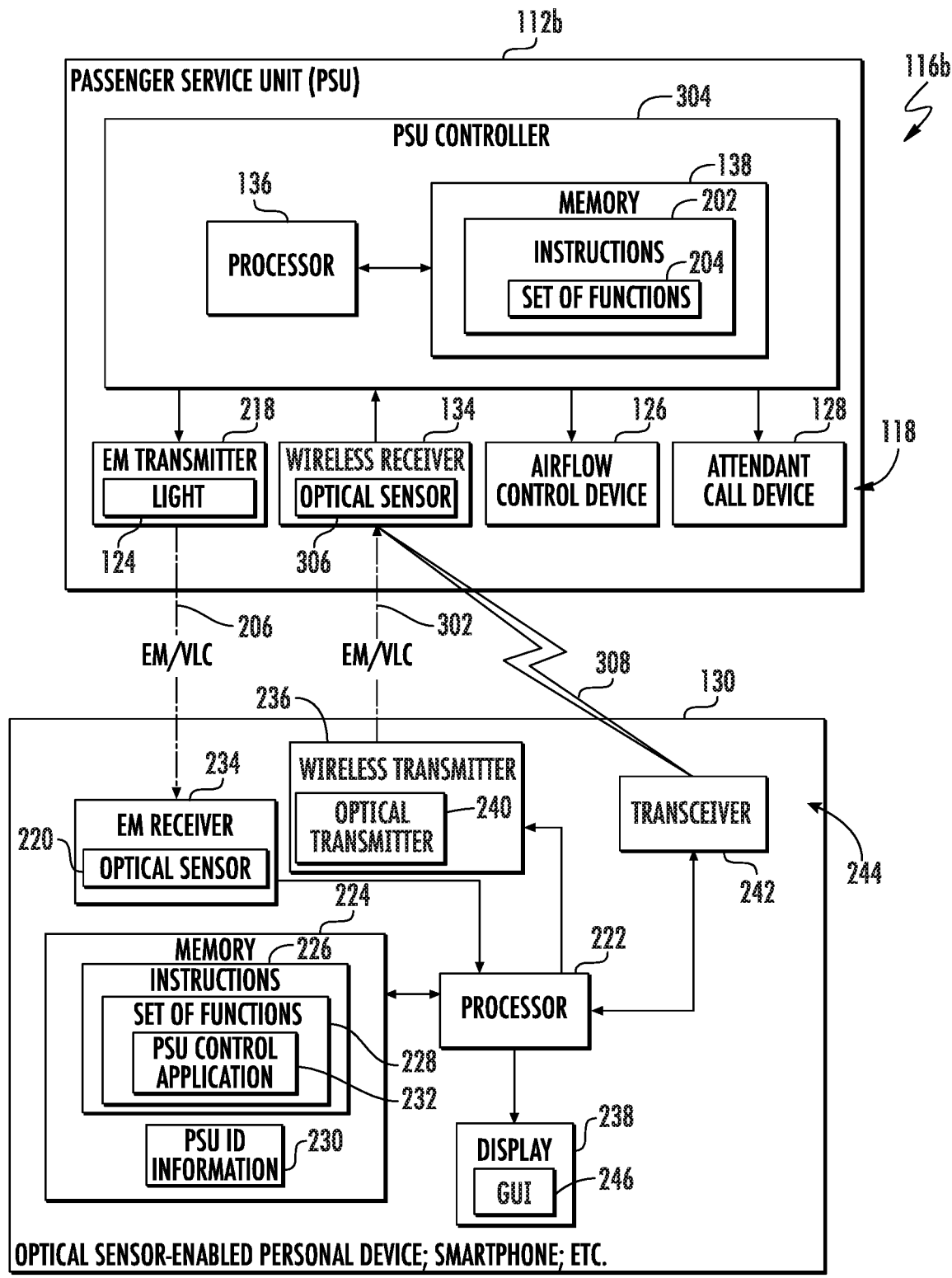
FIG. 3 is a block schematic diagram of an example of a system for controlling a passenger service unit of the fuselage of FIG. 1, in accordance with another example of the subject disclosure.

FIG. 3 is a block schematic diagram of an example of a system 116b for controlling a passenger service unit 112b of the fuselage of FIG. 1, in accordance with another example of the subject disclosure. In some examples, the system 116b is used for the system 116 in FIG. 1 and the passenger service unit 112b is used for the passenger service unit 112 in FIG. 1. The personal device 130 is the same as the personal device 130 described with reference to FIG. 2. The passenger service unit 112b is an example of a standalone passenger service unit 112b. Accordingly, one of the uses or benefits of the system 116b is that the system 116b is implementable in aircraft without a cabin network control system 132.

The system 116b includes a processor 136 and a memory 138 associated with the processor 136 that are the same as the system 116a in FIG. 2. In the example in FIG. 3, the passenger service unit 112b includes a passenger service unit (PSU) controller 304 that is configured to control operation of the passenger service unit 112b as described herein. The processor 136 and memory 138 of the system 116b are components of the PSU controller 304. The memory 138 includes computer-readable program instructions 202 that, when executed by the processor 136 causes the processor 136 to perform a set of functions 204 that are the same as those described with respect to the system 116a in FIG. 2. An example of the set of functions 204 will be described in more detail with reference to FIG. 5 as operations or steps of the method 500 performed by the passenger service unit 112a or 112b.

The passenger service unit 112b also includes an EM transmitter 218, an airflow control device 126 and an attendant call device 128 that are the same as the passenger service unit 112a. The EM transmitter 218 of passenger service unit 112b operates the same as the EM transmitter 218 of passenger service unit 112a described with reference to FIG. 2. The passenger service unit 112b further includes a wireless receiver 134 configured to receive a wireless control message 302 or 308 from the personal device 130 of the passenger 114. The wireless control message 302 or 308 includes the identification of the one or more selected devices 118 of the passenger service unit 112b to be controlled and the control input for each of the one or more selected devices 118. The wireless receiver 134 is configured to receive a wireless control message 302 from the wireless transmitter 236 of the personal device 130 or a wireless control message 308 from the transceiver 242 of the personal device 130. In some examples, the wireless receiver 134 includes an optical sensor 306 configured to receive a visible light communication (VLC) control message as the wireless control message 302 from an optical transmitter 240 or light of the personal device 130. The wireless transmitter 236 of the personal device 130 is an optical transmitter 240 or light configured to transmit the wireless control message 302 as a VLC control message. The VLC control message is receivable by the optical sensor 306 of the passenger service unit 112b. In some examples, the optical transmitter 240 or light is also used as a flash for a camera of the personal device 130. In other examples, the wireless receiver 134 is configured to receive a wireless control message 308 from the transceiver 242 of the personal device 130.

Figure 4:
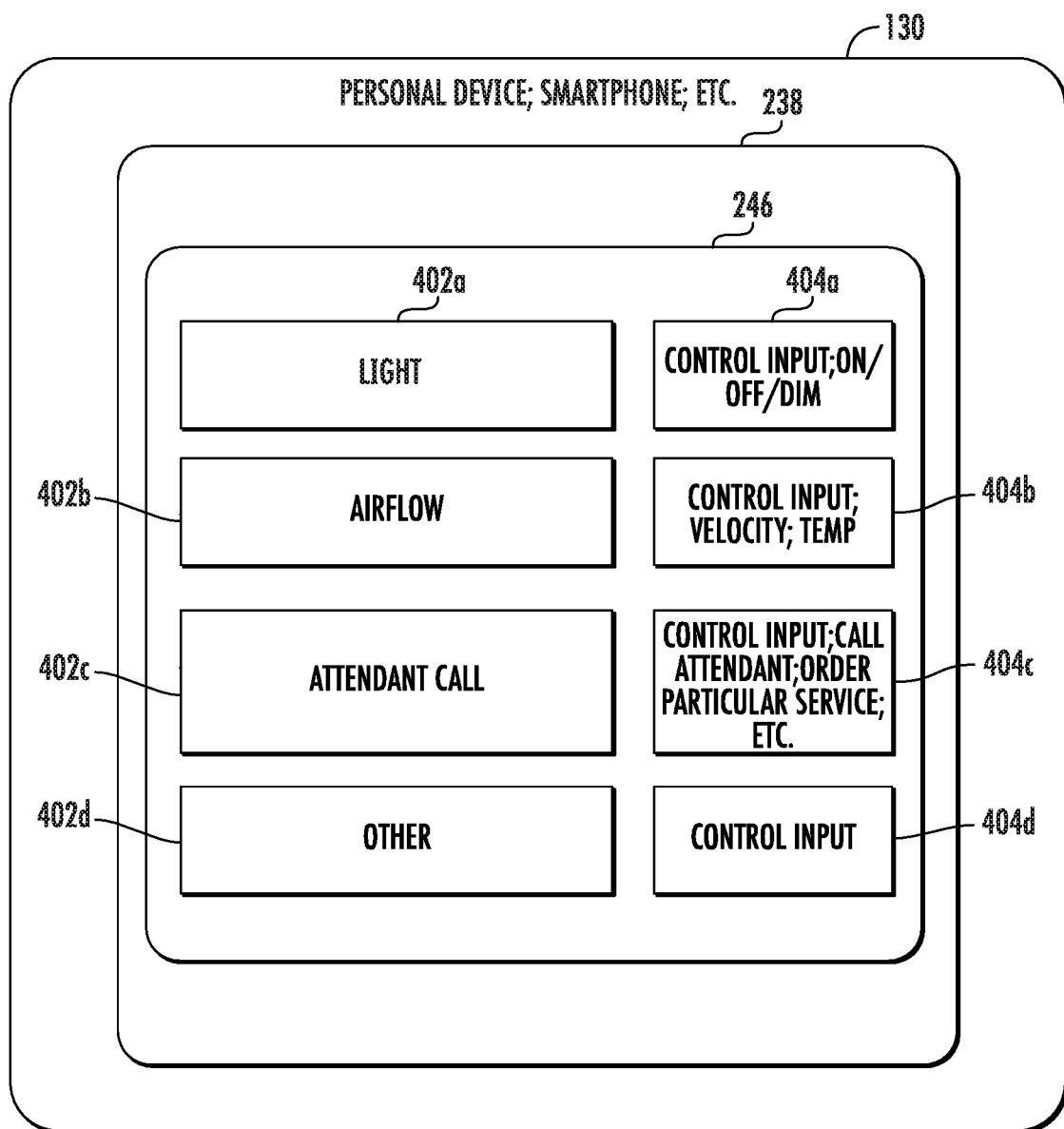
FIG. 4 is an illustration of an example of a graphical user interface (GUI) for controlling a passenger service unit of FIGS. 1 to 3, in accordance with an example of the subject disclosure.

FIG. 4 is an illustration of an example of a graphical user interface (GUI) 246 for controlling the one or more selected devices 118 (FIGS. 1-3) of a passenger service unit 112a or 112b in accordance with an example of the subject disclosure. As previously described, the PSU control application 232 (FIGS. 2-3) is configured to control the display 238 of the personal device 130 to present the graphical user interface 246 on the display 238 to allow a particular device 118 or devices 118 of the passenger service unit 112a or 112b to be selected by the passenger 114 for controlling operation of the particular device 118 or devices 118. The particular device 118 or devices 118 of the passenger service unit 112a or 112b represented in the graphical user interface 246 for selection by the passenger 114 include at least one of a light 124, for example a reading light, an airflow control device 126, and an attendant call device 128. In the example in FIG. 4, the GUI 246 includes a first feature 402a or button to select the light 124 and to enter a control input 404a to control operation of the light 124. Examples of the control input 404a for the light 124 include on, off, or a setting for dimming the light 124.

The GUI 246 also includes a second feature 402b or button to select the airflow control device 126 and to enter a control input 404b to control operation of the airflow control device 126. Examples of the control input 404b for the airflow control device 126 include but are not necessarily limited to velocity or volume of the airflow and a temperature of the airflow.

The GUI 246 also includes a third feature 402c or button to select the attendant call device 128 and to enter a control input 404c to control operation of the attendant call device 128. Examples of the control input 404c for the attendant call device 128 include but are not necessarily limited to calling the attendant and/or ordering a particular service.

In some examples, the GUI 246 includes a fourth feature 402d or button to select another device 118 that is a component of certain types of passenger service units 112. A feature to enter an input control 404d is also associated with the fourth feature 402d.

Figure 5:
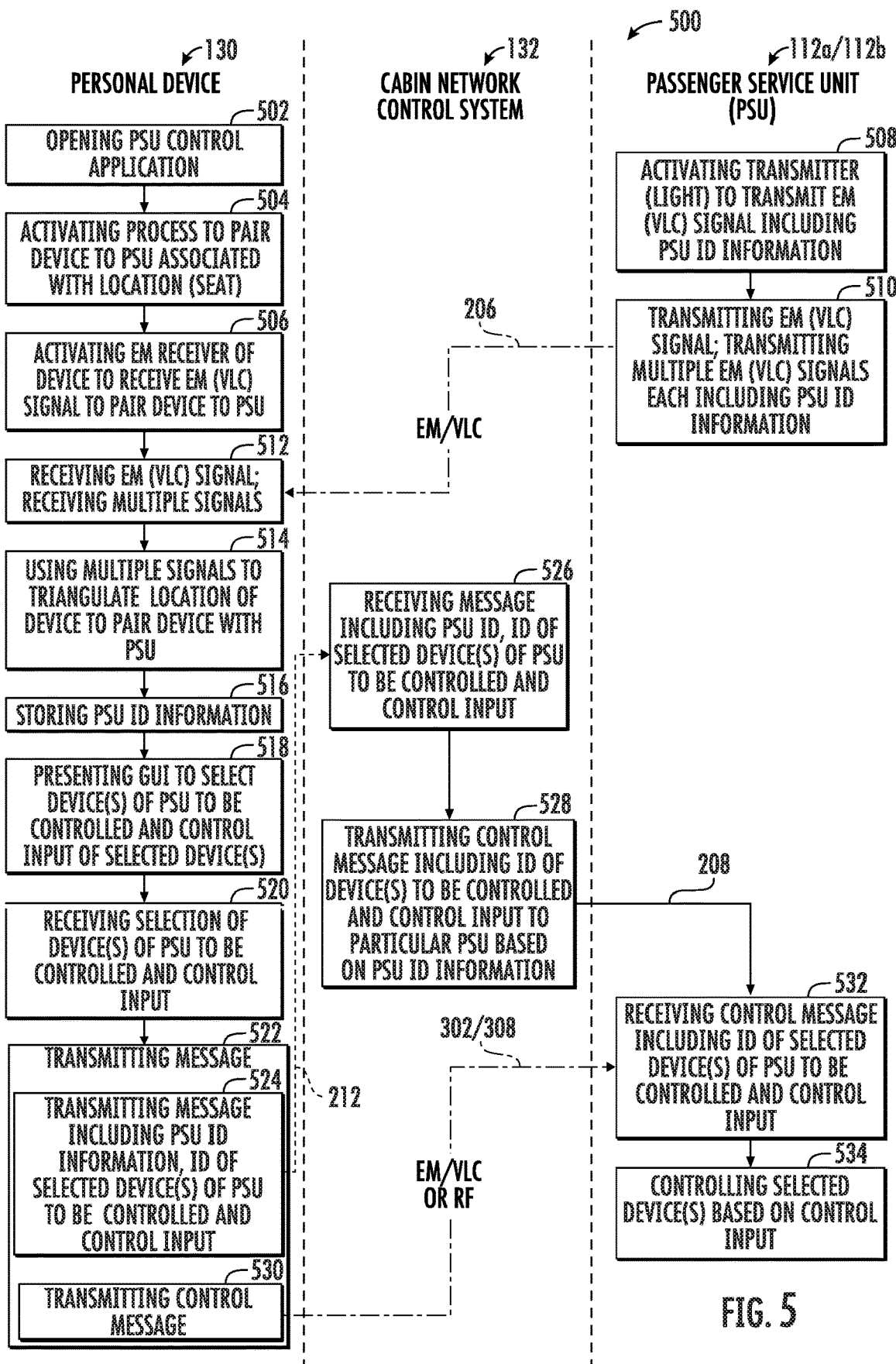
FIG. 5 is flow chart of an example of a method for controlling a passenger service unit of FIGS. 1 to 3 that may use the GUI of FIG. 4, in accordance with some examples of the subject disclosure.

FIG. 5 is flow chart of an example of a method 500 for controlling a passenger service unit 112a or 112b of FIGS. 1 to 3 that may use the GUI of FIG. 4, in accordance with some examples of the subject disclosure. The exemplary method 500 is divided into operations performed by a personal device 130 of a passenger 114 (FIG. 1), operations or method steps performed by a cabin network control system 132, if present, and operations performed by the passenger service unit (PSU) 112a or 112b. In some examples, the method 500 is embodied in and performed by components of the system 116, 116a or 116b as described herein.

The method 500 includes at least transmitting 510 an EM signal 206, receiving 532 a control message 208, 302, or 308, and controlling 534 operation of the passenger service unit (PSU) 112a or 112b. In an alternative embodiment, the method 500 includes at least receiving 512 an EM signal 206 and transmitting 522 a message 212, 302, or 308 for controlling 534 operation of the passenger service unit (PSU) 112a or 112b.

In block 502, the method 500 includes opening or activating a PSU control application 232 on a personal device 130 by an action of a user or passenger 114. As previously described, examples of the personal device 130 include but are not necessarily limited to a smartphone, tablet computer, laptop computer with a camera, or any optical sensor-enabled personal device.

In block 504, the method 500 includes activating a process, by the PSU control application 232, to pair the personal device 130 of the passenger 114 to the passenger service unit 112a or 112b associated with the location of the personal device 130 which corresponds to the seat 106 of the passenger 114.

In block 506, the method 500 also includes activating an electromagnetic (EM) receiver 234 of the personal device 130, by the PSU control application 232, to receive an EM signal 206 from the passenger service unit 112a or 112b to pair the personal device 130 to the passenger service unit 112a or 112b associated with the location or seat 106 of the passenger 114. As previously described, the PSU control application 232 is configured to control the EM receiver 234 of the personal device 130 to receive the EM signal 206 from the passenger service unit 112a or 112b. The EM signal 206 includes identification information 230 of the passenger service unit 112a or 112b. In some examples, the EM receiver 314 is an optical sensor 220, e.g., camera of a smartphone, tablet, laptop computer, etc.

In block 508, the method 500 includes activating an EM transmitter 218 of the passenger service unit 112a or 112b to transmit the EM signal 206 that is receivable by the EM receiver 234 of the personal device 130 of the passenger 114. In some examples, the EM transmitter 218 is activated by the passenger service module 210 (FIG. 2) or PSU controller 304 (FIG. 3) in response to an input from a flight crew member. For example, the flight crew member enters an input into the cabin network control system 132 or other cabin control mechanism, and the cabin network control system 132 or cabin control mechanism causes the passenger service module 210 or PSU controller 304 to activate the EM transmitter 218.

In block 510, the method 500 includes transmitting, by the passenger service unit 112*a* or 112*b*, an electromagnetic (EM) signal 206 that is receivable by the personal device 130 of the passenger 114. The EM signal 206 includes identification information 230 of the passenger service unit 112*a* or 112*b*. The identification information 230 is used to pair the personal device 130 of the passenger 114 to the passenger service unit 112*a* or 112*b* associated with the location of the personal device 130 or the seat 106 of the passenger 114. The EM signal 206 is transmitted by the EM transmitter 218 of the passenger service unit 112*a* or 112*b* to the EM receiver 234 of the personal device 130.

In some examples, as previously described, the EM transmitter 218 is a light 124 of the passenger service unit 112*a* or 112*b*. Accordingly, transmitting the EM signal 206 includes transmitting a visible light communication (VLC) signal that is receivable by an optical sensor 220 of the personal device 130. Visible light communication is also referred to as light fidelity (LiFi). The VLC signal includes the identification information 230 of the passenger service unit 112*a* or 112*b* to pair the personal device 130 with the passenger service unit 112*a* or 112*b* associated with the seat 106 of the passenger 114.

In some examples, transmitting the EM signal 206 includes using pulse-width modulation (PWM) in the EM signal 206 to define the identification information 230 of the passenger service unit 112*a* or 112*b* to the personal device 130 of the passenger 114. Using the PWM includes cycling a light, such as the light 124, of the passenger service unit 112*a* or 112*b* on and off at a PWM rate that is faster than a human eye can detect. A PWM rate for VLC communications is less than about one millisecond or faster. A PWM rate that is noticeable to the human eye is about 16 milliseconds or slower. The visible portion of the EM spectrum includes wavelengths between about 450 nanometers and about 850 nanometers. However, an EM transmitter 218 and corresponding EM receiver 234 operating in different portions of the EM spectrum are also useable.

In some examples, transmitting the EM signal 206 in block 510 includes transmitting multiple EM signals 206 or VLC signals to the personal device 130. The multiple EM signals 206 are used by the personal device 130 to triangulate a location of the personal device 130 to pair the personal device 130 with a particular passenger service unit 112*a* or 112*b*. Each of the multiple EM signals 206 includes the identification information 230 of the passenger service unit 112*a* or 112*b*.

In block 512, the method 500 includes receiving, by a personal device 130 of the passenger 114, the electromagnetic (EM) signal 206. As previously described, the EM signal 206 includes identification information 230 of the passenger service unit 112*a* or 112*b*. The identification information 230 of the passenger service unit 112*a* or 112*b* is used to pair the personal device 130 with a particular passenger service unit 112*a* or 112*b* associated with the location of the personal device 130 or the seat 106 of the passenger 114.

In some examples, as previously described, receiving the EM signal 206 by the personal device includes receiving a VLC signal that is receivable by the optical sensor 220 of the personal device 130.

In some examples, receiving the EM signal includes using pulse-width modulation (PWM) in the EM signal 206 to define the identification information 230 of the passenger service unit 112*a* or 112*b*.

In some examples, the method 500 in block 512 includes receiving multiple EM signals 206 transmitted by the passenger service unit 112*a* and 112*b*. In block 514, the method 500 also includes using the multiple EM signals 206 to triangulate a location of the personal device 130, based on relative signal strength of the multiple EM signals 206, to pair the personal device 130 with a particular passenger service unit 112*a* or 112*b*. As previously described, the personal device 130 of the passenger 114 includes a passenger service unit (PSU) control application 232 configured to pair the personal device 130 with the particular passenger service unit 112*a* and 112*b* using the multiple EM signals 206 and based on the identification information 230 of the passenger service unit 112*a* or 112*b*. The PSU control application 232 pairs the personal device 130 with the particular passenger service unit 112*a* and 112*b* based on the relative signal strength of the multiple EM signals 206.

In block 516, the identification information 230 of the passenger service unit 112*a* and 112*b* paired with the personal device 130 is stored in a memory 224 of the personal device 130. In some examples, as described herein, a wireless message 212 transmitted to the cabin network control system 132 includes the identification information 230 of the passenger service unit 112*a* for controlling one or more selected devices 118 of the passenger service unit 112*a*.

In block 518, the method 500 includes presenting a graphical user interface (GUI) 246 for selecting one or more device 118 of the passenger service unit 112*a* or 112*b* to be controlled, and for enter a control input 404*a*-404*d* for each of the one or more selected devices 118. As previously described, the PSU control application 232 is configured to control the display 238 of the personal device 130 to present the GUI 246 on the display 238 to allow a particular device or devices 118 of the passenger service unit 112*a* or 112*b* to be selected by the passenger 114 for controlling operation of the particular device or devices 118.

In block 520, the method 500 includes receiving a selection of one or more devices 118 of the passenger service unit 112*a* or 112*d* to be controlled and a control input for each of the one or more selected devices 118. The one or more selected devices 118 and the control input for each of the one or more selected devices 118 are received by the personal device 130 from the passenger 114 via the GUI 246.

In block 522, the method 500 includes transmitting a message for controlling operation of the one or more selected devices 118 of the passenger service unit 112*a* or 112*b*. The message includes at least an identification of the one or more selected devices 118 of the passenger service unit 112*a* or 112*b* and a control input 404*a*-404*d* for each of the one or more selected devices 118.

In some examples and where the aircraft includes a cabin network control system 132 and/or the passenger service unit 112 does not include a wireless receiver 134, e.g., passenger service unit 112*a*, the method 500 or PSU control application 232 performs the operation in block 524. In block 524, transmitting the message includes transmitting a wireless message 212 to a cabin network control system 132 for controlling the one or more selected devices 118 of the passenger service unit 112*a*. The wireless message 212 includes the identification information 230 of the passenger service unit 112*a*, the identification of the one or more selected devices 118 of the passenger service unit 112*a* to be controlled, and the control input 404*a*-404*d* for each of the one or more selected devices 118 of the passenger service unit 112a. The cabin network control system 132 is configured to transmit (block 528) a control message 208 to the passenger service unit 112a in response to receiving (block 526) the wireless message 212. The control message 208 includes the identification information 230 of the passenger service unit 112a, the identification of the one or more selected devices 118 of the passenger service unit 112a to be controlled, and the control input 404a-404d for each of the one or more selected devices 118.

In some examples, where the passenger service unit includes a wireless receiver 134, e.g., passenger service unit 112b, the method 500 or PSU control application 232 performs the operation in block 530. In block 530, transmitting the message includes transmitting a wireless control message 302 or 308 from the personal device 130 of the passenger 114 to the passenger service unit 112b to control operation of the one or more selected devices 118 of the passenger service unit 112b in response to the wireless control message 302 or 308. In some examples, as previously described, the personal device 130 includes a wireless transmitter 236 that transmits the wireless control message 302 to the passenger service unit 112b. The PSU control application 232 is configured to control the wireless transmitter 236 of the personal device 130 to transmit the wireless control message 302 to the passenger service unit 112b to control operation of the one or more selected devices 118. The wireless control message 302 includes the identification of the one or more selected devices 118 of the passenger service unit 112b and the control input 404a-404d for each of the one or more selected devices 118. The PSU control application 232 is configured to control transmitting either the wireless message 212 to the cabin network control system 132, or transmitting the wireless control message 302 or 308 to the passenger service unit 112a or 112b based on capabilities of systems on a particular aircraft and/or preference of an airline.

In some examples, transmitting the wireless control message 302 includes transmitting a VLC control message from the personal device 130 to the passenger service unit 112b. In these examples, the wireless transmitter 236 is an optical transmitter 240 configured to transmit the wireless control message 302 as a VLC control message that is receivable by an optical sensor 306 of the passenger service unit 112b.

In other examples, the transceiver 242 of the personal device 130 transmits a wireless control message 308 to the wireless receiver 134 of the passenger service unit 112b. The PSU control application 232 is configured to control the transceiver 242 of the personal device 130 to transmit the wireless control message 308 to the passenger service unit 112b to control operation of the one or more selected devices 118. The wireless control message 308 includes the identification of the one or more selected devices 118 of the passenger service unit 112b to be controlled and the control input 404a-404d for each of the one or more selected devices 118.

In block 532, the method 500 includes receiving a control message 208, 302 or 308, by the passenger service unit 112a or 112b. The control message 208, 302 or 308 includes an identification of the one or more selected devices 118 of the passenger service unit 112a or 112b and a control input 404a-404d for each of the one or more selected devices 118. In examples where the aircraft includes a cabin network control system 132 and/or the passenger service unit 112a (FIG. 2) does not include a wireless receiver 134, the passenger service unit 112a receives a control message 208 from the cabin network control system 132. In examples where the aircraft does not include a cabin network control system 132 and/or the passenger service unit 112b includes a wireless receiver 134, the wireless receiver 134 of the passenger service unit 112b receives a wireless control message 302 from a wireless transmitter 236 of the personal device 130, or the wireless receiver 134 receives a wireless control message 308 from a transceiver 242 of the personal device 130. In examples where the wireless receiver 134 of the passenger service unit 112b is an optical sensor 306, the optical sensor 306 receives a VLC control message 302 from an optical transmitter 240 of the personal device 130.

In block 534, the method 500 includes controlling operation of each of the one or more selected devices 118 of the passenger service unit 112a or 112b in response to receiving the control message 208, 302 or 308 and based on the control input 404a-404d for each of the one or more selected devices.

Further, the disclosure comprises examples according to the following clauses:

Clause 1. A method for controlling a passenger service unit, the method comprising:
  receiving, by a personal device of a passenger, an electromagnetic (EM) signal, wherein the EM signal comprises identification information of the passenger service unit; and
  transmitting, by the personal device, a message for controlling operation of one or more selected devices of the passenger service unit, the message comprising an identification of the one or more selected devices of the passenger service unit and a control input for each of the one or more selected devices.

Clause 2. The method of clause 1, wherein receiving the EM signal comprises receiving a visible light communication (VLC) signal that is receivable by an optical sensor of the personal device.

Clause 3. The method of any of clauses 1 or 2, wherein receiving the EM signal comprises using pulse-width modulation (PWM) in the EM signal to define the identification information of the passenger service unit.

Clause 4. The method of any of clauses 1-2, or 3, wherein using the PWM comprises cycling a light of the passenger service unit on and off at a PWM rate that is faster than a human eye can detect.

Clause 5. The method of any of clauses 1-3, or 4, further comprising:
  receiving multiple EM signals transmitted by the passenger service unit; and
  using the multiple EM signals to triangulate a location of the personal device to pair the personal device with a particular passenger service unit, wherein the personal device of the passenger comprises a passenger service unit (PSU) control application configured to pair the personal device with the particular passenger service unit using the multiple EM signals and based on the identification information of the passenger service unit.

Clause 6. The method of any of clauses 1-4, or 5, wherein transmitting the message comprises transmitting a wireless message to a cabin network control system for controlling the one or more selected devices of the passenger service unit, the wireless message comprising the identification information of the passenger service unit, the identification of the one or more selected devices of the passenger service unit to be controlled, and the control input for each of the one or more selected devices of the passenger service unit, wherein the cabin network control system is configured to transmit a control message to the passenger service unit in response to receiving the wireless message, the control message comprising the identification information of the passenger service unit, the identification of the one or more selected devices of the passenger service unit to be controlled, and the control input for each of the one or more selected devices.

Clause 7. The method of any of clauses 1-5, or 6, wherein transmitting the message comprises transmitting a wireless control message from the personal device of the passenger to the passenger service unit to control operation of the one or more selected devices of the passenger service unit in response to the wireless control message.

Clause 8. The method of any of clauses 1-6, or 7, wherein transmitting the wireless control message comprises transmitting a VLC control message from the personal device to the passenger service unit.

Clause 9. A personal device configured to control a passenger service unit, the personal device comprising:
 a processor; and
 a memory associated with the processor, the memory comprising computer-readable program instructions that, when executed by the processor causes the processor to perform the method of any of clauses 1-8, or 9.

Clause 10. A personal device configured to control a passenger service unit, the personal comprising:
 a processor; and
 a memory associated with the processor, the memory comprising computer-readable program instructions that, when executed by the processor causes the processor to perform a set of functions comprising:
 receiving an electromagnetic (EM) signal, wherein the EM signal comprises identification information of the passenger service unit; and
 transmitting a message for controlling operation of one or more selected devices of the passenger service unit, the message comprising an identification of the one or more selected devices of the passenger service unit and a control input for each of the one or more selected devices.

Clause 11. A personal device configured to control a passenger service unit, the personal device comprising:
 a passenger service unit (PSU) control application operating on a personal device of a passenger;
 an electromagnetic (EM) receiver, wherein the PSU control application is configured to control the EM receiver of the personal device to receive an electromagnetic (EM) signal from the passenger service unit, the EM signal comprising identification information of the passenger service unit; and
 a transmitter, wherein the PSU control application is configured to control the transmitter of the personal device to transmit a message for controlling operation of one or more selected devices of the passenger service unit, the message comprising an identification of the one or more selected devices of the passenger service unit and a control input for each of the one or more selected devices.

Clause 12. The personal device of clause 11, wherein the EM receiver comprises an optical sensor configured to receive a visible light communication (VLC) signal as the EM signal.

Clause 13. The personal device of any of clauses 11 or 12, wherein the EM receiver is configured to receive the EM signal using pulse-width modulation in the EM signal to define the identification information of the passenger service unit.

Clause 14. The personal device of any of clauses 11-12, or 13, wherein the PSU control application is further configured to control the EM receiver of the personal device to receive multiple EM signals from the passenger service unit, and wherein the PSU control application uses the multiple EM signals to triangulate a location of the personal device to pair the personal device to a particular passenger service unit.

Clause 15. The personal device of any of clauses 11-13, or 14, further comprising a display, wherein the PSU control application is further configured to control the display of the personal device to present a graphical user interface on the display to allow a particular device or devices of the passenger service unit to be selected by the passenger for controlling operation of the particular device or devices.

Clause 16. The personal device of any of clauses 11-14, or 15, wherein the particular device or devices of the passenger service unit represented in the graphical user interface for selection by the passenger comprises at least one of a light, an airflow control device, and an attendant call device.

Clause 17. The personal device of any of clauses 11-15, or 16, wherein the transmitter is a transceiver of the personal device and wherein the PSU control application is further configured to control the transceiver of the personal device to transmit a wireless message to a cabin network control system for controlling operation of the one or more selected devices of the passenger service unit, the wireless message comprising the identification information of the passenger service unit, the identification of the one or more selected devices of the passenger service unit, and the control input for each of the one more selected devices of the passenger service unit.

Clause 18. The personal device of any of clauses 11-16, or 17, wherein the cabin network control system is configured to transmit a control message to the passenger service unit in response to receiving the wireless message from the personal device, the control message comprising the identification information of the passenger service unit, the identification of the one or more selected devices of the passenger service unit and the control input for each of the one or more selected devices.

Clause 19. The personal device of any of clauses 11-17, or 18, wherein the transmitter is a wireless transmitter of the personal device and wherein the PSU control application is further configured to control the wireless transmitter of the personal device to transmit a wireless control message to the passenger service unit to control operation of the one or more selected devices, the wireless control message comprising the identification of the one or more selected devices of the passenger service unit and the control input for each of the one or more selected devices.

Clause 20. The personal device of any of clauses 11-18, or 19, wherein the wireless transmitter is configured to transmit the wireless control message as a visible light communication (VLC) control message, the VLC control message being receivable by an optical sensor of the passenger service unit.

The subject disclosure may be a system 116, a method 500, and/or a computer program product. In some examples, the set of functions 204 and 228 are embodied on a computer program product, such as memory 138 or 204 or other computer program product as described herein. The computer program product may include a computer-readable storage medium (or media) having computer-readable program instructions thereon for causing a processor to carry out aspects of the subject disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the subject disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some examples, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the subject disclosure.

Aspects of the subject disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer-readable program instructions.

The flowchart and block diagrams in the Figures illustrate the architecture, functionality, and operation of possible implementations of systems, methods, and computer program products according to various examples of the subject disclosure. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular examples only and is not intended to be limiting of examples of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present examples has been presented for purposes of illustration and description, but is not intended to be exhaustive or limited to examples in the form disclosed. Many modifications and variations will be apparent to those of ordinary skill in the art without departing from the scope and spirit of examples.

Although specific examples have been illustrated and described herein, those of ordinary skill in the art appreciate that any arrangement which is calculated to achieve the same purpose may be substituted for the specific examples shown and that the examples have other applications in other environments. This application is intended to cover any adaptations or variations. The following claims are in no way intended to limit the scope of examples of the disclosure to the specific examples described herein.

What is claimed is:

1. A method for controlling a passenger service unit, the method comprising:
  receiving, by a mobile personal device of a passenger, an electromagnetic (EM) signal, wherein the EM signal comprises identification information of the passenger service unit; and
  transmitting, by the mobile personal device, a message for controlling operation of one or more selected devices of the passenger service unit, the message comprising an identification of the one or more selected devices of the passenger service unit and a control input for each of the one or more selected devices, wherein transmitting the message comprises transmitting a wireless control message from the mobile personal device of the passenger directly to the passenger service unit without going through a cabin network control system to control operation of the one or more selected devices, and wherein the wireless control message comprises one of a visible light communication (VLC) wireless control message or a radio frequency wireless control message.

2. The method of claim 1, wherein receiving the EM signal comprises receiving a visible light communication (VLC) signal that is receivable by an optical sensor of the mobile personal device.

3. The method of claim 1, wherein receiving the EM signal comprises using pulse-width modulation (PWM) in the EM signal to define the identification information of the passenger service unit.

4. The method of claim 3, wherein using the PWM comprises cycling a light of the passenger service unit on and off at a PWM rate that is faster than a human eye can detect.

5. The method of claim 1, further comprising:
receiving multiple EM signals transmitted by multiple passenger service units; and
using the multiple EM signals to triangulate a location of the mobile personal device to pair the mobile personal device with a particular passenger service unit, wherein the mobile personal device of the passenger comprises a passenger service unit (PSU) control application configured to pair the mobile personal device with the particular passenger service unit using the multiple EM signals and based on the identification information of the passenger service unit.

6. The method of claim 1, wherein the passenger service unit comprises a processor configured to control operation of the one or more selected devices of the passenger service unit in response to the wireless control message from the mobile personal device of the passenger.

7. The mobile personal device configured to control the passenger service unit, the mobile personal device comprising:
a processor; and
a memory associated with the processor, the memory comprising computer-readable program instructions that, when executed by the processor causes the processor to perform the method of claim 1.

8. The method of claim 1, wherein transmitting the control message comprises transmitting the radio frequency wireless control message by a wireless transmitter of the mobile personal device, wherein the radio frequency wireless control message comprises the identification of the one or more selected devices of the passenger service unit to be controlled and the control input for each of the one or more selected devices.

9. The method of claim 1, further comprising presenting a graphical user interface on a display of the mobile personal device to allow a particular device or devices of the passenger service unit to be selected by the passenger for controlling operation of the particular device or devices.

10. A mobile personal device configured to control a passenger service unit, the mobile personal device comprising:
a processor; and
a memory associated with the processor, the memory comprising computer-readable program instructions that, when executed by the processor causes the processor to perform a set of functions comprising:
receiving an electromagnetic (EM) signal, wherein the EM signal comprises identification information of the passenger service unit; and
transmitting a message for controlling operation of one or more selected devices of the passenger service unit, the message comprising an identification of the one or more selected devices of the passenger service unit and a control input for each of the one or more selected devices, wherein transmitting the message comprises transmitting a wireless control message from the mobile personal device of the passenger directly to the passenger service unit without going through a cabin network control system to control operation of the one or more selected devices, and wherein the wireless control message comprises one of a visible light communication (VLC) wireless control message or a radio frequency wireless control message.

11. A mobile personal device configured to control a passenger service unit, the mobile personal device comprising:
a passenger service unit (PSU) control application operating on the mobile personal device of a passenger;
an electromagnetic (EM) receiver, wherein the PSU control application is configured to control the EM receiver of the mobile personal device to receive an electromagnetic (EM) signal from the passenger service unit, the EM signal comprising identification information of the passenger service unit; and
a transmitter, wherein the PSU control application is configured to control the transmitter of the mobile personal device to transmit a message for controlling operation of one or more selected devices of the passenger service unit, the message comprising an identification of the one or more selected devices of the passenger service unit and a control input for each of the one or more selected devices, wherein the message comprises a wireless control message transmitted from the mobile personal device directly to the passenger service unit without going through a cabin network control system to control operation of the one or more selected devices, and wherein the wireless control message comprises one of a visible light communication (VLC) wireless control message or a radio frequency wireless control message.

12. The mobile personal device of claim 11, wherein the EM receiver comprises an optical sensor configured to receive a visible light communication (VLC) signal as the EM signal.

13. The mobile personal device of claim 11, wherein the EM receiver is configured to receive the EM signal using pulse-width modulation in the EM signal to define the identification information of the passenger service unit.

14. The mobile personal device of claim 11, wherein the PSU control application is further configured to control the EM receiver of the mobile personal device to receive multiple EM signals from multiple passenger service units, and wherein the PSU control application uses the multiple EM signals to triangulate a location of the mobile personal device to pair the mobile personal device to a particular passenger service unit.

15. The mobile personal device of claim 11, further comprising a display, wherein the PSU control application is further configured to control the display of the mobile personal device to present a graphical user interface on the display to allow a particular device or devices of the passenger service unit to be selected by the passenger for controlling operation of the particular device or devices.

16. The mobile personal device of claim 15, wherein the particular device or devices of the passenger service unit represented in the graphical user interface for selection by the passenger comprises at least one of a light, an airflow control device, and an attendant call device.

17. The mobile personal device of claim 11, wherein the transmitter is a transceiver of the mobile personal device and wherein the PSU control application is further configured to control the transceiver of the mobile personal device to transmit the radio frequency wireless control message directly to passenger service unit for controlling operation of the one or more selected devices of the passenger service unit, the radio frequency wireless control message comprising the identification of the one or more selected devices of the passenger service unit, and the control input for each of the one or more selected devices of the passenger service unit.

18. The mobile personal device of claim 11, wherein the transmitter is a wireless transmitter of the mobile personal device and wherein the PSU control application is further configured to control the wireless transmitter of the mobile personal device to transmit the wireless control message directly to the passenger service unit to control operation of the one or more selected devices, the wireless control message comprising the identification of the one or more selected devices of the passenger service unit and the control input for each of the one or more selected devices.

19. The mobile personal device of claim 11, wherein the wireless transmitter comprises an optical transmitter and is configured to transmit the wireless control message as the visible light communication (VLC) control message, the VLC control message being receivable by an optical sensor of the passenger service unit.

20. The mobile personal device of claim 19, wherein the optical transmitter comprises a light of the mobile personal device or a flash for a camera of the mobile personal device.

* * * * *